No. 740,614. PATENTED OCT. 6, 1903.
N. BECKWITH.
OPERATING MECHANISM FOR DUMB WAITERS.
APPLICATION FILED NOV. 12, 1902.
NO MODEL. 2 SHEETS—SHEET 2.

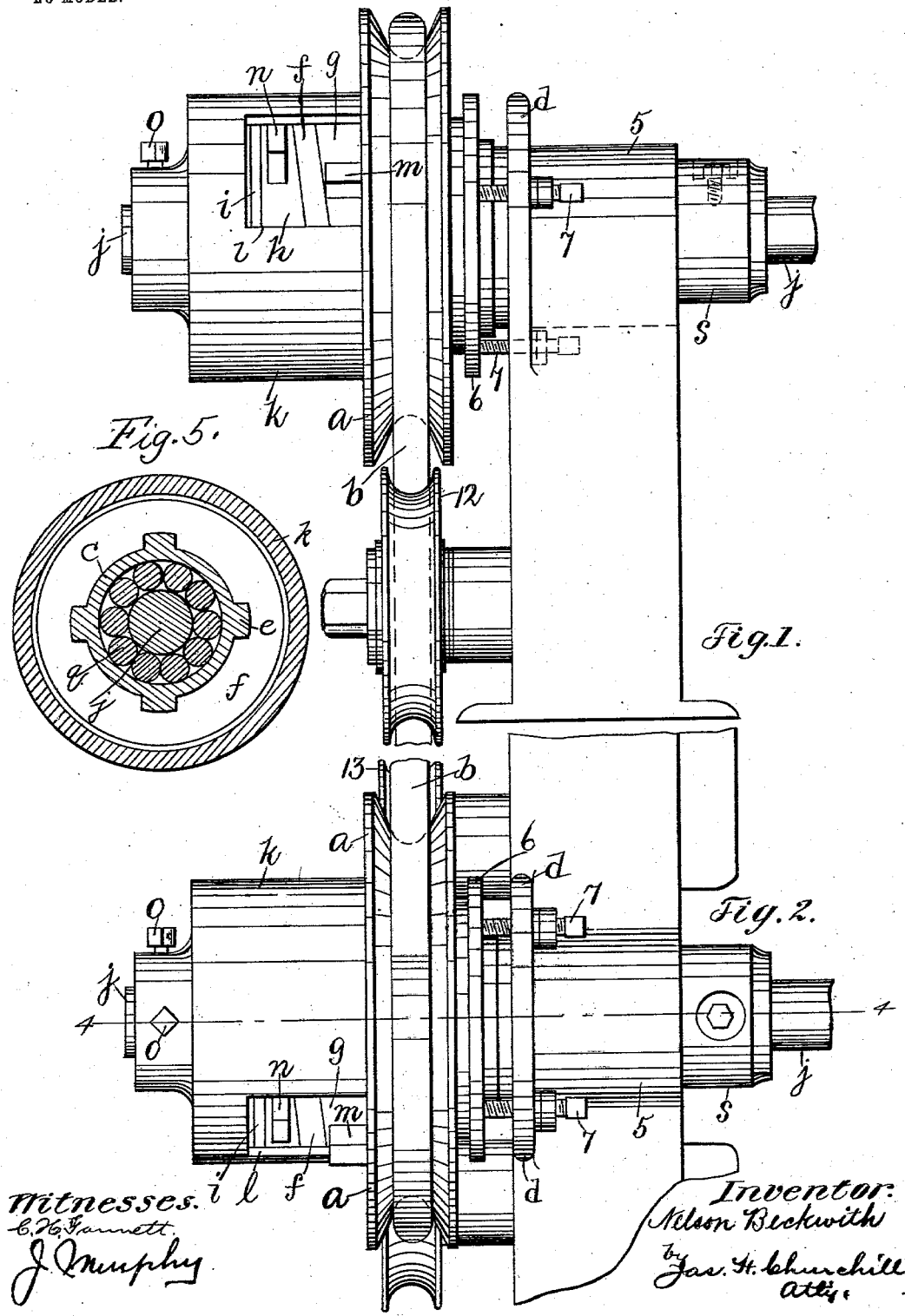

Witnesses.
Inventor:
Nelson Beckwith
by Jas. H. Churchill
Atty.

No. 740,614.

Patented October 6, 1903.

UNITED STATES PATENT OFFICE.

NELSON BECKWITH, OF SOMERVILLE, MASSACHUSETTS.

OPERATING MECHANISM FOR DUMB-WAITERS.

SPECIFICATION forming part of Letters Patent No. 740,614, dated October 6, 1903.

Application filed November 12, 1902. Serial No. 130,980. (No model.)

*To all whom it may concern:*

Be it known that I, NELSON BECKWITH, a citizen of the United States, residing in Somerville, in the county of Middlesex and State of Massachusetts, have invented an Improvement in Operating Mechanism for Dumb-Waiters, of which the following description, in connection with the accompanying drawings, is a specification, like characters on the drawings representing like parts.

This invention relates to an operating mechanism for dumb-waiters, and has for its object to provide a simple and efficient mechanism for the purpose specified, and one which can be put up or installed at a minimum expense and in a minimum time, and which also can be quickly and easily adjusted.

The particular features of this invention will be pointed out in the claims at the end of this specification.

Figure 3:
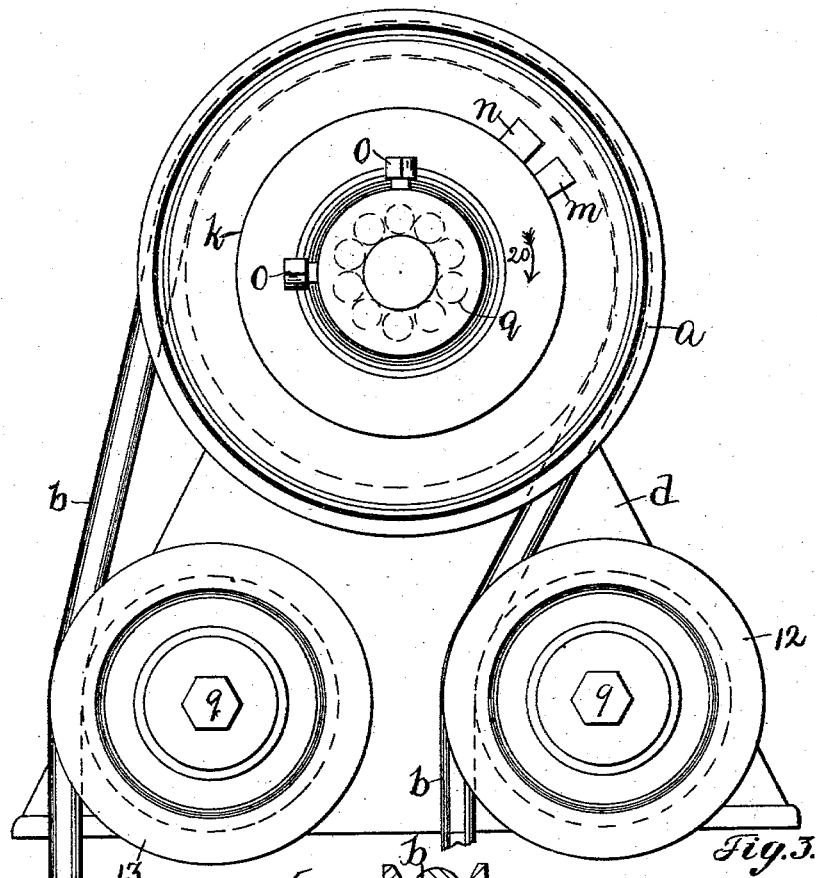
Figure 4:
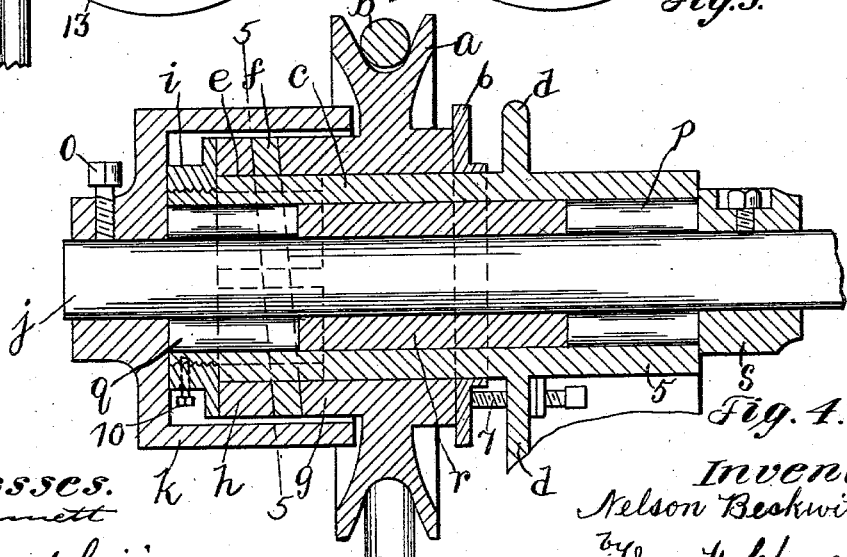

Figure 1 is a front elevation of an operating mechanism embodying this invention; Fig. 2, a plan view of the operating mechanism shown in Fig. 1; Fig. 3, an elevation of the mechanism shown in Fig. 1 looking toward the right; Fig. 4, a section on the line 4 4, Fig. 2, and Fig. 5 a section on the line 5 5, Fig. 4.

Referring to the drawings, $a$ represents a pulley, over which is passed the hoisting rope or cable $b$ for the dumb-waiter, (not shown,) one end of the rope $b$ in practice being fastened to the waiter and the other end to a suitable counterbalance. (Not shown.)

The pulley $a$ is mounted to turn on a cylindrical hollow boss $c$, attached to a standard or upright support $d$, preferably triangular in shape. (Shown in Fig. 3.)

The hollow boss $c$ is reduced in diameter at its end, and this reduced portion is provided with longitudinally-extended ribs or keys $e$, which are engaged by correspondingly-shaped slots in a ring $f$, which coöperates with an inclined or cam face of the hub $g$ of the pulley $a$ and with an inclined or cam face of a ring $h$, loosely mounted on the ribs or keys $e$. The ring $h$ is retained on the hollow boss $c$ by a nut $i$ on the threaded end of the said boss. The nut $i$ is fastened in its adjusted position by a set-screw 10. The rings $h$ $f$ and the hub $g$ of the pulley $a$ form a clutch by which the pulley is held from revolving when the clutch is in one position and is permitted to be revolved when the clutch is in another position.

A shaft $j$ is extended through the hollow boss $c$ and through a hub or boss 5 on the opposite side of the upright $d$ in line with the boss $c$, and the said shaft has fast on it an enlarged hub or sleeve $k$, provided with a slot $l$, into which extends a lug $m$ on the hub $g$ of the pulley and a lug $n$ on the ring $h$. The hub $k$ is fastened to its shaft, as shown, by the set-screws $o$.

The shaft $j$ is provided with two sets $p$ $q$ of roller-bearings, one set, $p$, being located within the boss 5 and the other set, $q$, being located within the hollow boss $c$ at its outer end, the space between the said sets of roller-bearings being filled with a sleeve $r$, of wood or other suitable material. The shaft $j$ has fast on it a collar $s$, which serves to keep the roller-bearings $p$ within the hub or boss 5 and prevents longitudinal movement in one direction of the shaft $j$. When the lug $n$ on the ring $h$ is in line with the lug $m$ on the hub $g$ of the pulley, the latter is loose on its shaft; but when the lugs are out of line with each other the inclined or cam face on the hub wedges the ring $f$ between the cam-faces of the hub and ring, thereby frictionally holding the pulley $a$ fast between the nut $i$ and a disk or washer 6, which is loose on the hollow boss between the pulley and the standard, but is held from movement by the screws or bolts 7, extended through the standard $d$. The disk or washer 6 is adjustable on the hollow boss to compensate for wear of the clutch, and this adjustment is effected by the screws or bolts 7, preferably three in number, one being extended through the standard $d$ below the hollow boss 5 and the other two being extended through the standard $d$ above the hollow boss 5. (See Figs. 1 and 2.)

The standard $d$ at its lower end or base is provided with suitable holes on opposite sides of a vertical line through the center of the hollow boss to receive stud-shafts 9, upon which idler-pulleys 12 13 may be mounted, so that the end of the rope or cable $b$ may be attached to the dumb-waiter substantially in a vertical line through the center of the shaft $j$, thereby insuring an easier-running apparatus, and when the space or well is narrow or small the idler-pulley 13 may be used to guide the end of the rope *b*, attached to the counterweight.

By reference to Figs. 1 and 2 it will be seen that the operating apparatus is simple, compact, and capable of being adjusted by means of the screws 7, thereby avoiding all necessity of removing the hub *k* to obtain access to the nut *i*. The hollow bosses *c* and 5 are preferably cast integral with the standard and enable the shaft *j* to be supported on roller-bearings at points substantially widely separated, thereby insuring an easy-running apparatus.

In operation with the apparatus herein shown the pulley *a* is rendered loose on the hollow boss when the lugs *n m* are in line with each other, which is effected by rotating the shaft *j* by means of a hand-rope, (not shown,) but which is passed over a pulley (not shown) on the shaft *j*, which parts are not shown, as they are common to this class of apparatus. As long as the lugs *m n* are kept in line with each other the high points of the inclined surfaces or cam-faces of the hub *g* and ring *h* are substantially diametrically opposite and the wedging action of said inclined faces is prevented and the pulley *a* is rendered loose on the hollow boss, so that further rotation of the shaft *j*—as, for instance, in the direction indicated by arrow 20, Fig. 3—will permit the elevator-car to descend. If it is desired to stop the elevator-car, the operator holds onto the hoisting-rope and the pulley *a* will continue to rotate in the direction of the arrow 20, if the car is loaded, until the lug *m* has been moved out of line with the lug *n*, at which time the cam-face of the hub *g* will wedge the ring *f* between it and the cam-face of the ring *h*, and thereby stop the descent of the car. If it is desired to again start the car, the shaft *j* is rotated in the proper direction, according to whether the car is to ascend or descend, to bring the lugs *m n* into line with each other, which is effected, as herein shown, by the hub *k*. If it is desired to ascend, the shaft *j* is turned in the direction opposite to that indicated by the arrow 20, Fig. 1.

I claim—

1. In a hoisting apparatus of the class described, in combination, a standard or upright provided with a hollow boss extended from one side thereof, a shaft extended through said standard and said hollow boss, a pulley loose on said hollow boss, a clutch to frictionally hold said pulley from rotating, means carried by said standard for moving said pulley longitudinally on said hollow boss, and a device on said shaft to operate said clutch and release said pulley, substantially as described.

2. In a hoisting apparatus of the class described, in combination, a standard or upright provided with a hollow boss extended from one side thereof, a pulley normally loose on said hollow boss, a nut fast on said hollow boss, clutch-rings interposed between said nut and said pulley, a washer or disk loose on said hollow boss between said pulley and said standard, and means carried by said standard for moving said disk or washer on said hollow boss, for the purpose specified.

3. In a hoisting apparatus of the class described, in combination, a standard or upright provided with hollow bosses extended from opposite sides thereof, a shaft extended through said hollow bosses, roller-bearings for said shaft within said hollow bosses, means within one of said hollow bosses to separate said roller-bearings, a pulley loose on one of said hollow bosses and provided with a hub having an inclined or cam-shaped face, a lug projecting radially from said hub, a cam-ring loose on one of said hollow bosses and provided with a radially-extended lug, a ring keyed on one of said hollow bosses intermediate said cam-ring and the hub of said pulley, a nut on the end of the same hollow boss, a device fast on said shaft and adapted to engage the said radially-extended lugs, a washer or disk intermediate said pulley and standard, and adjusting screws or bolts carried by said standard and engaging said disk or washer, substantially as described.

4. In a hoisting apparatus of the class described, in combination, a standard or upright provided with a hollow boss extended from one side thereof, a shaft extended through said standard and said hollow boss, roller-bearings for said shaft within the hollow boss and at the opposite ends thereof to afford a long bearing for said shaft, a pulley loose on said hollow boss, a clutch to frictionally hold said pulley from rotating, means on the hollow boss to resist movement of the pulley away from said standard, means carried by said standard for moving said pulley longitudinally on said hollow boss and away from said standard, and a device on said shaft to operate said clutch and release said pulley, substantially as described.

In testimony whereof I have signed my name to this specification in the presence of two subscribing witnesses.

NELSON BECKWITH.

Witnesses:
JAS. H. CHURCHILL,
J. MURPHY.